United States Patent [19]

Roos et al.

[11] Patent Number: 4,997,170
[45] Date of Patent: Mar. 5, 1991

[54] HYDRAULIC ENGINE MOUNT

[75] Inventors: Jürgen Roos, Trebur; Wilhelm Konrad, Wörrstadt, both of Fed. Rep. of Germany

[73] Assignee: General Motors Corporation, Detroit, Mich.

[21] Appl. No.: 439,082

[22] Filed: Nov. 20, 1989

[30] Foreign Application Priority Data

Nov. 30, 1988 [DE] Fed. Rep. of Germany ....... 3840286

[51] Int. Cl.$^5$ .............................................. F16F 5/00
[52] U.S. Cl. .................................. 267/140.1; 267/219
[58] Field of Search ................ 248/562; 267/217, 219, 267/140.1 R, 140.1 A

[56] References Cited

FOREIGN PATENT DOCUMENTS

| 3401662 | 7/1985 | Fed. Rep. of Germany . | |
|---|---|---|---|
| 3616043 | 1/1988 | Fed. Rep. of Germany . | |
| 57-138422 | 8/1982 | Japan | 267/140.1 |
| 0084431 | 4/1986 | Japan | 267/140.1 |

Primary Examiner—Duane A. Reger
Attorney, Agent, or Firm—Ronald L. Phillips

[57] ABSTRACT

A mount is formed from a rubber-metal mount and a damping device inserted therein. The rubber-metal mount is comprised of two support members interconnected by an elastomer member. The damping device has an inner hydraulic chamber and an outer hydraulic chamber which are interconnected through throttle passages and an annular passage. When the mount is to be used for operation without the damping device, the damping device is simply omitted.

8 Claims, 1 Drawing Sheet

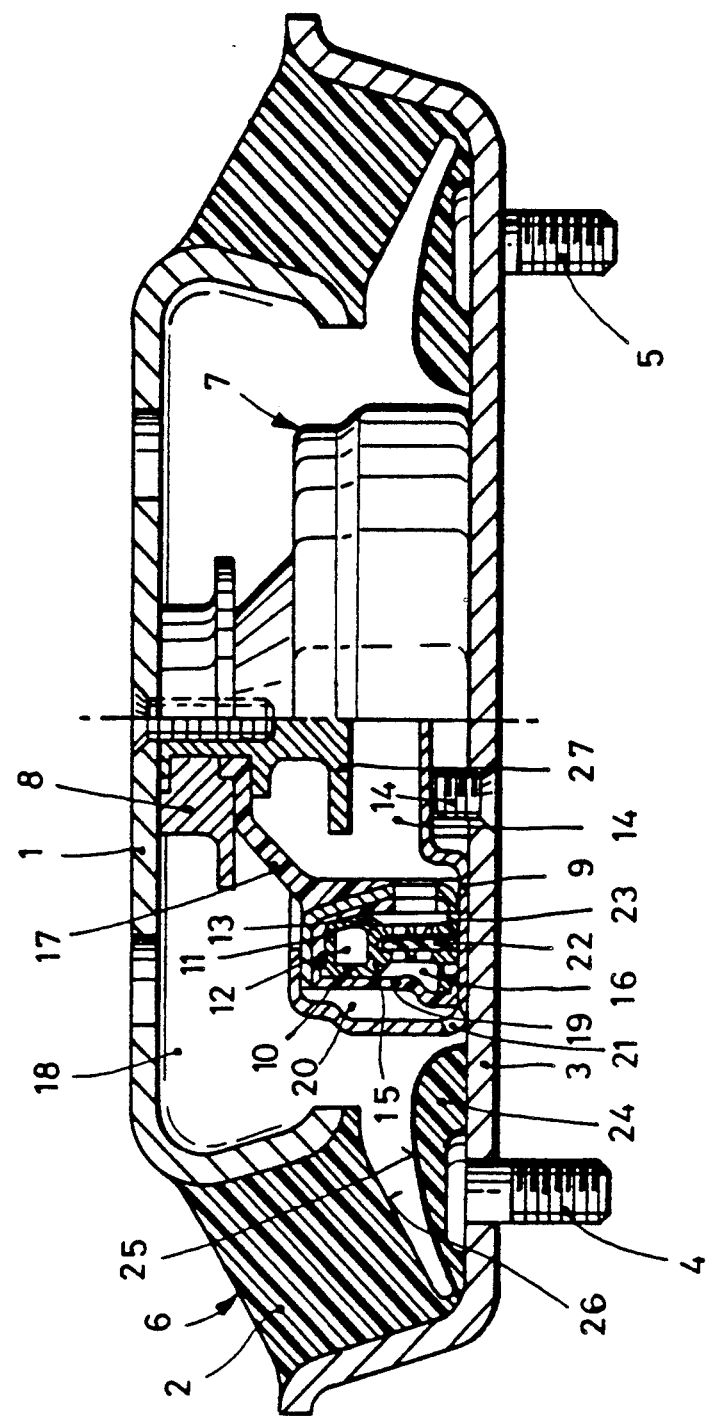

HYDRAULIC ENGINE MOUNT

Technical Field

This invention relates to a mount, especially an engine mount, including opposed upper and lower support members which are interconnected only through an elastomer element so as to form a rubber-metal mount, and further comprising a hydraulic damping device that is fitted inside the mount and insertable from one side thereof. The hydraulic damping device is comprised of two hydraulic chambers which are interconnected through throttle passages, one of the hydraulic chambers being bounded outwardly by an atmospherically biased elastic diaphragm to enable volumetric displacement thereof.

BACKGROUND OF THE INVENTION

An engine mount of the above type is found in German Offenlegungsschrift DE-OS34 01 662. This prior art mount is a hydraulic engine mount for supporting the axles of heavy motor vehicles. The engine mount is comprised of two rubber-metal mounts that are nested one inside the other, with the inner rubber-metal mount being fitted with a hydraulic damping device. The damping device is comprised of two hydraulic chambers, one of them being positioned above and the other below the elastomer element. The two rubber-metal mounts and the hydraulic device constitute a unified assembly, so that the engine mount cannot be alternatively utilized with or without the hydraulic damping device German Offenlegungsschrift DE-OS 36 16 043 discloses another related engine mount but in which both hydraulic chambers of the hydraulic damping device are fitted annularly around the engine mount. The disadvantage of this arrangement is that the volume of the two hydraulic chambers must be kept relatively small and, as a result, the damping effectiveness of this prior art engine mount is relatively limited. Furthermore, the hydraulic damping device in this engine mount is also an integral part of the engine mount assembly so that this engine mount, too, cannot be used alternatively with or without the hydraulic damping device. However, to have this option available is very important since the comfort requirements vary with different types of vehicles.

BRIEF SUMMARY OF THE INVENTION

It is an object of the present invention to modify a mount, especially an engine mount, of the type described in the foregoing so that it can be utilized either with or without the hydraulic damping device.

This is accomplished in accordance with the present invention by forming the rubber-metal mount and the hydraulic damping device as two separate independently functioning units.

This arrangement enables the engine mount to be used as a component that is equipped with the hydraulic damping device or as one in which the hydraulic damping device has been omitted. Furthermore, conventional rubber-metal mounts can be retrofitted with the hydraulic damping device for conversion into a hydraulic engine mount without the need for changes in the installation arrangement. This permits the use of lower priced rubber-metal mounts or, if higher comfort standards are desired, the use of higher priced hydraulic engine mounts.

The engine mount according to the invention is characterized by its simplicity in that the elastomer element is of frusto-conical configuration and in that the hydraulic damping device is arranged coaxially of the elastomer element inside the space enclosed by the elastomer element. This arrangement maximizes the use of the available volume for the inner hydraulic chamber.

To achieve further simplification, the invention provides the engine mount with an upper mounting plate that lies flat against the inner surface of the upper support member, and with a lower mounting plate that lies flat against the inner surface of the lower support member.

The hydraulic damping effect is maximized through relatively simple means by forming the hydraulic damping device with an inner hydraulic chamber and an annular outer hydraulic chamber that surrounds the inner hydraulic chamber, and interconnecting these chambers through an annular passage into which the throttle passages coming from the hydraulic chambers terminate.

The inner hydraulic chamber is also very simple in design and remains leak-proof even after removal of the same from the rubber-metal mount by the incorporation of an elastic diaphragm that forms the boundary of the inner hydraulic chamber, extends from the upper mounting plate of the damping device to a component that is rigidly connected to the lower mounting plate, and is surrounded by a space that is vented to the atmosphere.

The damping characteristics of the hydraulic damping device can be adapted, in a very simple manner, to meet varying comfort requirements. This is accomplished with an elastic diaphragm that separates the outer hydraulic chamber from an equalizing chamber that communicates with the atmosphere only through a vent passage having a narrow cross section. This enables the damping characteristics to be varied by making the cross section of the vent larger or smaller. Furthermore, the size of the volume of the equalizing chamber may be such that upon a predetermined degree of compression of the hydraulic damping device a hydraulic stop action will occur.

Communication between the two hydraulic chambers is accomplished in a simple manner in that the annular channel is formed between two annular cup-shaped bodies which are sealingly positioned one upon the other and which are provided with throttle passages.

Acoustic decoupling is achieved in accordance with another feature of the invention by the arrangement of an annular diaphragm between the two cup-shaped bodies that is responsive to the pressure exerted thereon by both hydraulic chambers and which, depending on the biasing direction, is adapted to sealingly engage the one or other cup-shaped body.

The damping effectiveness of the engine mount according to the invention is further improved with a dish-shaped attenuating disk that is contained in the inner hydraulic chamber.

Stop means are provided which, upon compression of the engine mount, enable axial travel of the mount to be limited while providing progressively increasing load bearing capacity. This is accomplished by providing the elastomer element with a stop portion that rests on the lower support member and has an upper arcuate surface positioned a radially decreasing distance from another portion of the elastomer element.

These and other objects, advantages and features of the present invention will become more apparent from the following description and drawing in which:

BRIEF DESCRIPTION OF DRAWING

The drawing illustrates a side elevation of an engine mount constructed according to the present invention, one half being shown in section, the other half being shown partially in section.

DETAILED DESCRIPTION OF INVENTION

The engine mount illustrated in the drawing has an upper support member 1 that is interconnected by means of a rim-shaped elastomer element 2 with a lower support member 3 that is provided with a pair of mounting bolts 4, 5. The two support members 1, 3 together with the elastomer element 2 form an independably operable rubber-metal engine mount 6. A hydraulic damping device 7 inserted in the rubber-metal mount has an upper mounting plate 8 that lies flat against the inner surface of the upper support member 1, and a lower mounting plate 9 that lies flat against the lower support member 3.

The lower mounting plate 9 is provided with a cup-shaped upwardly extending marginal portion so as to accommodate a pair of shell-type bodies 10, 11 which have an annular passage 12 formed therebetween. This annular passage 12 communicates via throttle passages 13 with an inner hydraulic chamber 14 and via throttle passages 15 with an outer, annular hydraulic chamber 16. The inner hydraulic chamber 14 extends up to the upper mounting plate 8, and an elastic diaphragm 17 is provided that separates the chamber 14 from a chamber 18 inside the engine mount. Chamber 18 is in constant communication wit h the atmosphere via a vent that has a relatively large cross section.

The outer hydraulic chamber 16 is bounded outwardly by a diaphragm 19 that is fastened to the shell-type body 10 and is adapted for movement into an equalizing chamber 20 that is vented to the atmosphere through a vent of relatively narrow cross section.

To effect further acoustic attenuation, the hydraulic damping device 7 has an annular diaphragm 22 that is sandwiched between the shell-type bodies 10, 11 and is positioned with axial play in an annular chamber. The diaphragm 22 is subjected on the one side to the pressure of the inner hydraulic chamber 14 and on the other side to the pressure of the outer hydraulic chamber 16.

Upon inward deflection, hydraulic fluid is forced to flow from the inner hydraulic chamber 14 via the throttle passages 13 into the annular chamber 12 and from there via the throttle chamber 15 into the outer hydraulic chamber 16. Since the diaphragm 19 is able to move unimpededly into the equalizing chamber 20, the outer hydraulic chamber 16 is capable of accommodating the volume being displaced from the inner hydraulic chamber 14.

The maximum inward deflection of the engine mount is progressively restricted by the elastomer element 2 being provided inwardly on the lower support member 3 with a stop portion 24 that has an arcuate surface area on the top. The elastomer element 2 is provided with a confronting surface 26 that is spaced from the surface 25 at a radially diminishing distance Upon inward deflection of the engine mount, the surface 26 initially contacts the diametrically opposite outer portion of the surface 25 and then progressively contacts the inner portion of surface 25 and eventually the stop portion 24.

The damping effectiveness is even further improved by an attenuating disk 27 that is provided inside the inner hydraulic chamber 14. The attenuating disk 27 is rigidly connected with the upper mounting plate 8 and is thus adapted to move in synchronism with the upper support member 1.

The foregoing description of the preferred embodiments of the invention has been presented for purposes of illustration and description. It is not intended to be exhaustive or to limit the invention to the precise form disclosed. Obvious modifications or variations are possible in light of the above teachings. The embodiments were chosen and described to provide the best illustration of the principals of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

The embodiments of the invention in which an exclusive property or privilege is claimed are defined as follows:

1. In combination with two oppositely spaced apart support members interconnected only by an elastomer member so as to form a rubber-metal mount, a hydraulic damping device adapted for insertion into the engine mount from one side thereof, said hydraulic damping device including two hydraulic chambers interconnected through throttle passages, one of the two hydraulic chambers being bounded outwardly by an atmospherically biased elastic diaphragm that enables volumetric displacement of said hydraulic chambers, said elastomer member having a frusto-conical configuration, and said hydraulic damping device arranged coaxially of the elastomer element inside a space enclosed by said elastomer element.

2. A combination as defined in claim 1 wherein said hydraulic damping device includes a first mounting plate that lies flat against an inner surface of one of the support members of the mount, and a second mounting plate that lies flat against an inner surface of the other support member.

3. A combination as defined in claim 2 wherein said hydraulic damping device includes an inner hydraulic chamber, an annular outer hydraulic chamber that surrounds said inner hydraulic chamber, throttle passages extending from said hydraulic chambers, said two hydraulic chambers interconnected by an annular passage into which said throttle passages coming from the hydraulic chambers terminate.

4. A combination as defined in claim 3 wherein an elastic diaphragm forms the boundary of the inner hydraulic chamber and extends from said one mounting plate of the damping device to a component that is rigidly connected to the lower mounting plate, and said elastic diaphragm surrounded by a chamber vented to the atmosphere.

5. A combination as set forth in claim 4 wherein said elastic diaphragm separates one of said hydraulic chambers from an equalizing chamber that is vented to the atmosphere only through a restricted vent passage.

6. A combination as defined in claim 5 wherein said annular passage is formed between two annular sealingly superposed cup-shaped bodies having throttle passages.

7. A combination as defined in claim 6 wherein an annular diaphragm responsive to the pressure exerted hereon by said hydraulic chambers is interposed with axial play in an annular chamber between said cup-shaped bodies, said annular diaphragm being adapted to sealingly engage, depending on the biasing direction, one or the other cup-shaped body.

8. A combination as defined in claim 7 wherein said elastomer element has a stop portion resting on said other support member, said stop portion having an arcuate surface, and said elastomer member having a portion thereof positioned opposite said arcuate surface and space apart therefrom at a radially diminishing distance.

* * * * *